July 17, 1962  O. WIRTH  3,044,721
AUTOMATIC MACHINE FOR HIGH SPEED WINDING
OF SMALL MOTOR ARMATURES
Filed Jan. 19, 1959
5 Sheets-Sheet 1
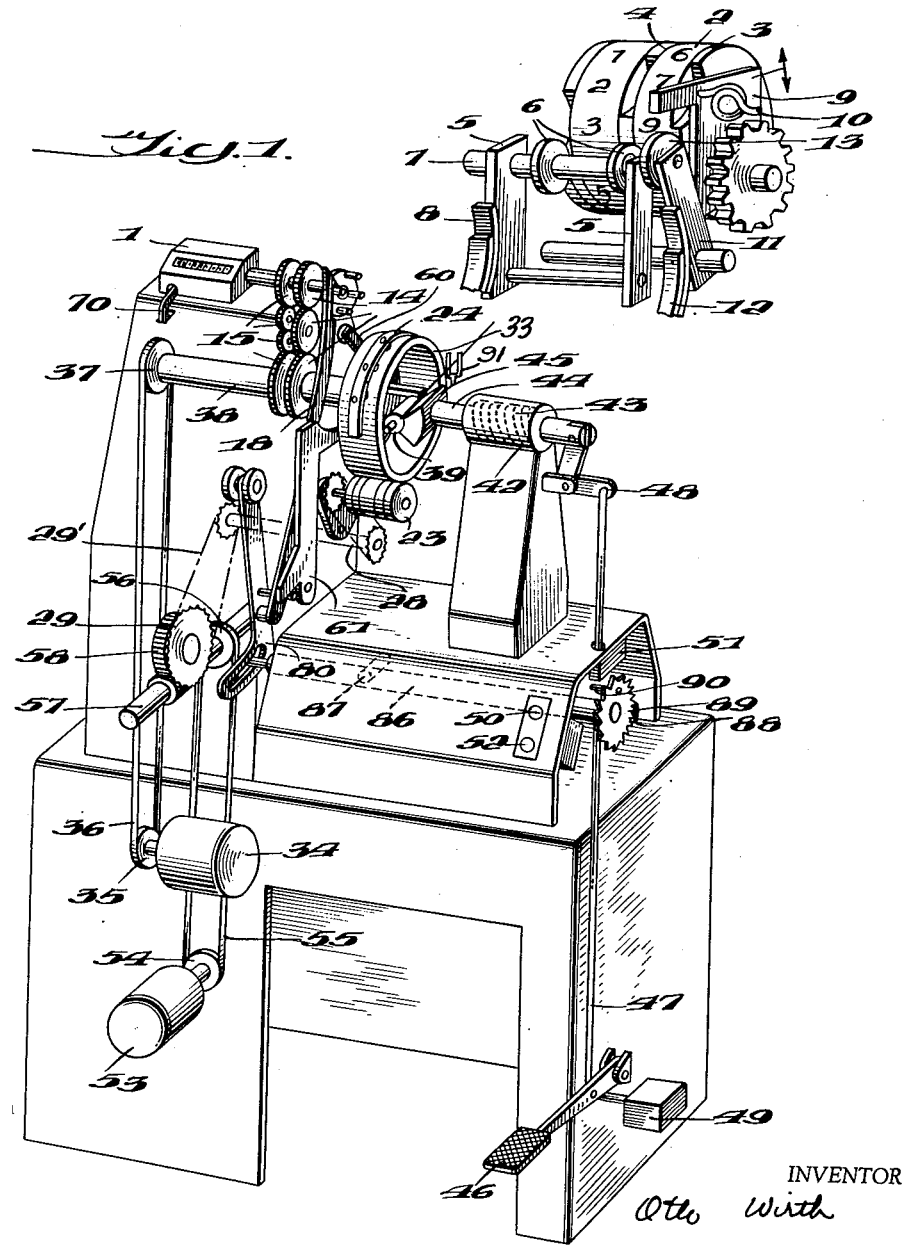
INVENTOR
Otto Wirth
BY Pierce, Scheffler & Parker
ATTORNEYS July 17, 1962
O. WIRTH
3,044,721
AUTOMATIC MACHINE FOR HIGH SPEED WINDING
OF SMALL MOTOR ARMATURES
Filed Jan. 19, 1959
5 Sheets-Sheet 3
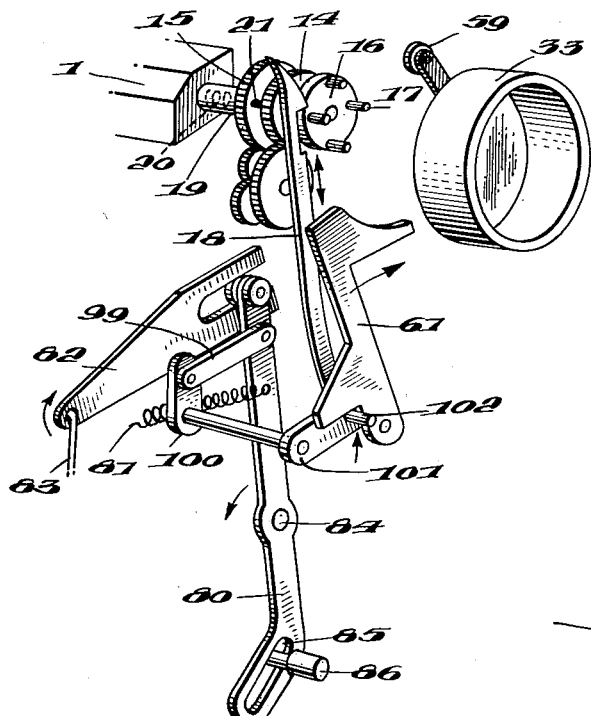
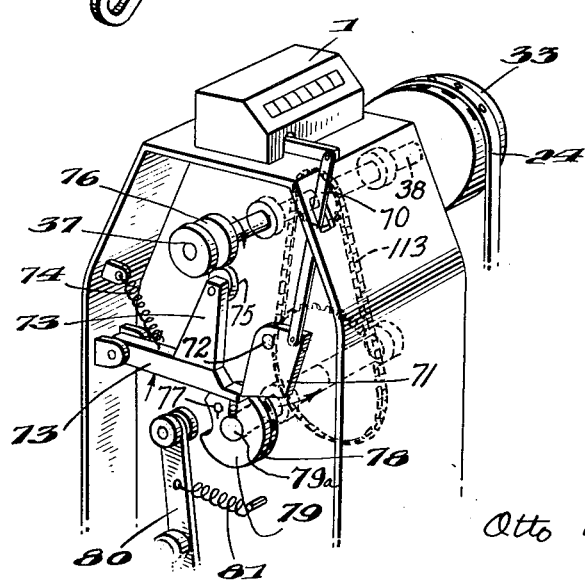
INVENTOR
Otto Wirth
BY Pierce Scheffler & Parker
ATTORNEYS July 17, 1962
O. WIRTH
3,044,721
AUTOMATIC MACHINE FOR HIGH SPEED WINDING
OF SMALL MOTOR ARMATURES
Filed Jan. 19, 1959
5 Sheets-Sheet 4
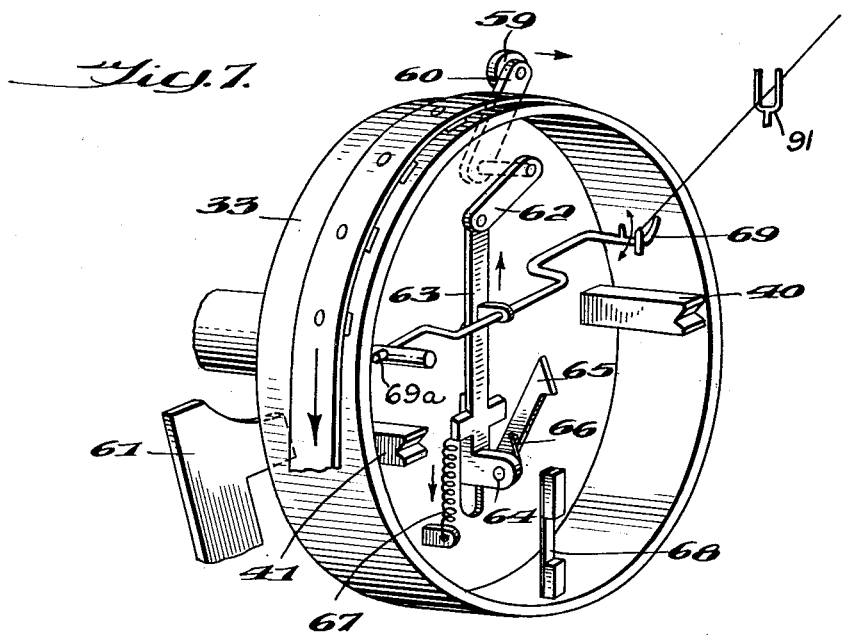
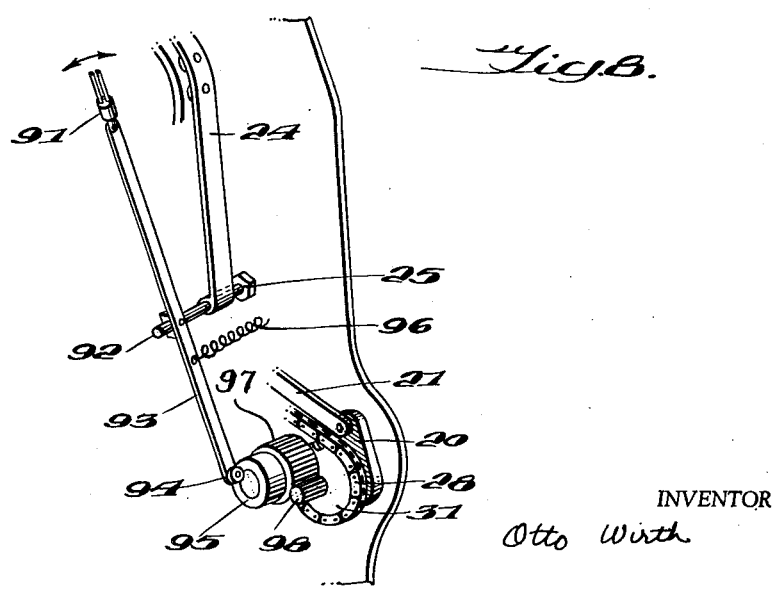
INVENTOR
Otto Wirth
BY Pierce, Scheffler & Parker
ATTORNEYS July 17, 1962 O. WIRTH 3,044,721
AUTOMATIC MACHINE FOR HIGH SPEED WINDING
OF SMALL MOTOR ARMATURES
Filed Jan. 19, 1959 5 Sheets-Sheet 5
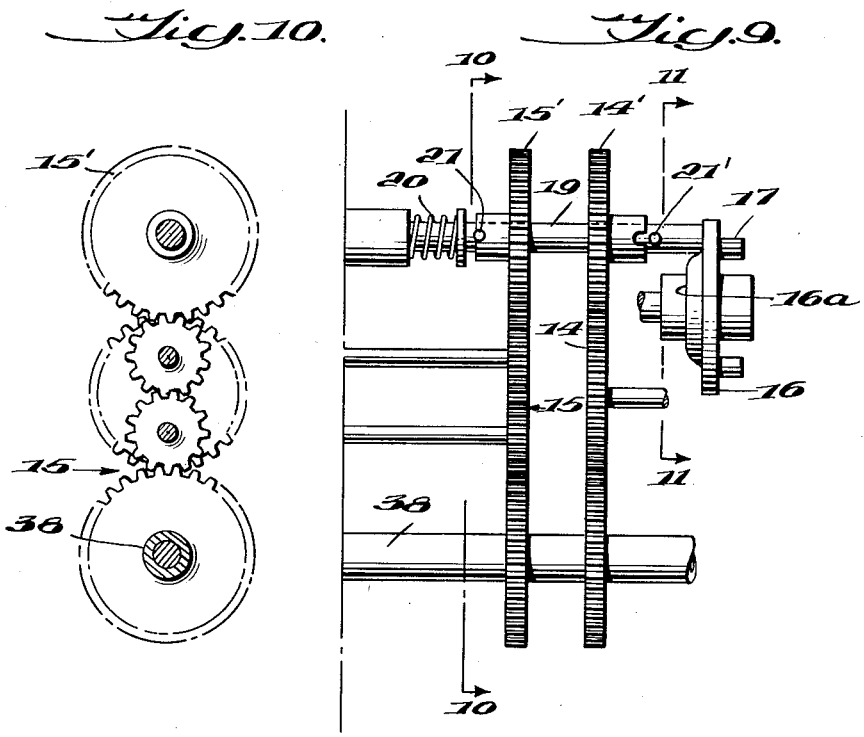
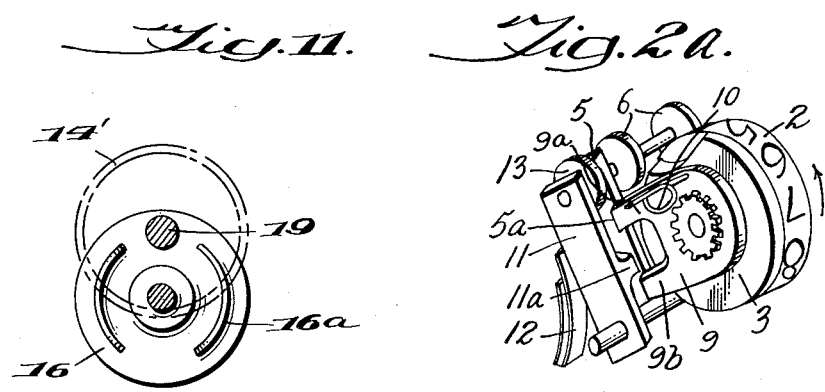
INVENTOR
Otto Wirth
BY Pierce, Schiffler & Parker
ATTORNEYS

United States Patent Office 3,044,721
Patented July 17, 1962

3,044,721
AUTOMATIC MACHINE FOR HIGH SPEED WINDING OF SMALL MOTOR ARMATURES
Otto Wirth, Zurich, Switzerland, assignor to Micafil A.-G., Zurich, Switzerland, a joint-stock company
Filed Jan. 19, 1959, Ser. No. 787,725
Claims priority, application Switzerland Jan. 25, 1958
6 Claims. (Cl. 242—13)

This invention relates generally to an automatic armature winding machine and more particularly to a high speed winding machine which will automatically brake a rotary armature-supporting facing plate when a given number of windings have been wound in an armature slot, draw out the tap connection of the wound coil, and then rotatably index the armature to position an empty coil slot adjacent the wire guide means.

It is well known in the prior art to wind the armatures of small electric motors in such a way that the windings are wound one after the other in the armature grooves. After each winding coil has been wound, the winding machine is stopped in order to draw out by hand for each commutator segment the necessary tap in the form of a loop and fasten it to a hook. In spite of an increase in rotational speed of such a winding machine, the tap-drawing and armature indexing operations require stoppage of the machine and this results in a very poor ratio of pure winding time to the total production time.

Thus the primary object of the present invention is to provide an automatic armature winding machine which will wind the coil windings at a very high rotational rate and then draw out the winding tap and index the armature to a new winding position at a reduced rotational rate.

A more specific object of my invention is to provide an automatic armature winding machine having an escapement type counter mechanism which, when a given number of winding turns have been indicated thereon, will simultaneously and automatically cause braking of the armature-supporting facing plate, drawing out of the tap connection of the wound coil, indexing of the armature to position an empty armature slot adjacent the wire guide means, and resetting of the counter mechanism so that the same will rotate in the opposite direction.

Other objects and advantages of the present invention will become more apparent from a study of the following specification when considered in conjunction with the accompanying drawings in which:

FIG. 1 is a perspective view of the automatic armature winding machine;

FIG. 2 is a detailed perspective view of the counter mechanism;

FIG. 2a is also a perspective view similar to FIG. 2 but which shows the counter mechanism from the rear;

FIG. 5 is a detailed perspective view of the means for reversing the operation of the counter mechanism;

FIG. 6 is a detailed perspective view of the counter actuated means for operating the armature indexing means;

FIG. 7 is a detailed perspective view of the armature indexing means within the rotatable face plate;

FIG. 8 is a detailed perspective view of the means for distributing the wire in the armature slots during the winding thereof; and FIGS. 9, 10 and 11 are detail views illustrating the reversible driving mechanism for the counter.

Figure 3:
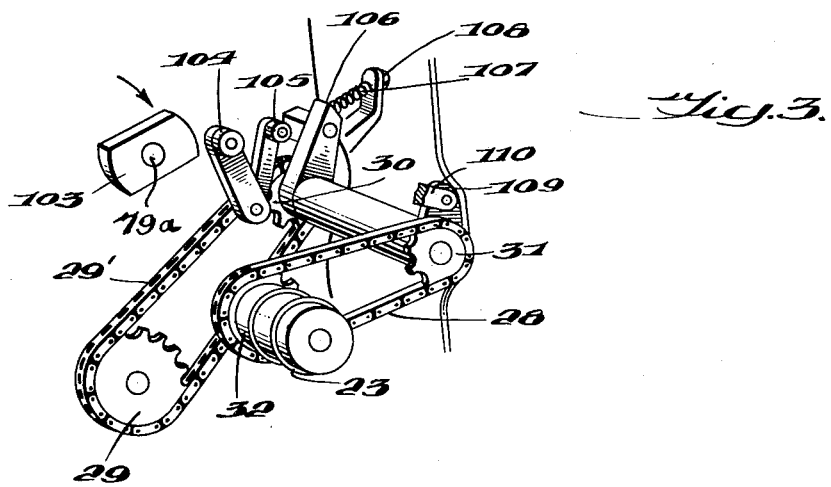
FIGS. 3 and 4 are detailed perspective views of the means for braking the face place which carries the armature to be wound.

Referring now to FIGS. 1 and 2, the counter mechanism 1 is of the escapement type having a unit disk 2 which controls the indexing and reversing operations of the machine. The unit disk 2 has on either side thereof two cams 3 and 4. Similar cams are provided for the other counter disks. As will be described in greater detail below, the counter shaft is alternately rotated forwardly and backwardly and can be set for a maximum of 9999 windings. The follower rollers 6 on lever 5 are arranged to fall into the cam recesses of the units to thousands disks only when these recesses are colinearly aligned parallel to the roller axis 7. The cams can be adjustably angularly positioned as desired to initiate the indexing operation at the end of a predetermined number of counter turns. When the selected number of windings is reached, the lever 5, which is pivotally biased by leaf-spring 8 against the counter disks, will be pivotally displaced toward the disks when follower rollers 6 extend into the aligned cam recesses to initiate the indexing operation of the machine. The braking and indexing process requires six revolutions after which the rotational direction of the counter disks is reversed as will be described below. After reversal the counting of the windings will take place by subtraction until at zero the follower 13 secured to lever 11 will extend within the recess of cam surface 3 so that lever 11 biased by leaf spring 12 will pivot toward the counter disks and thus trigger the counter reversing and armature indexing operations of the machine.

In order to prevent levers 5 or 11 from triggering the reversing operation during the run-back of the counter rollers for the six revolutions necessary for indexing, there is attached to the unit disk a check lever 9 which is biased against the face of cam 3 by a spring 10 and which is shown in FIGS. 2 and 2a. Due to the biasing action of spring 10, check lever 9 will be caused to turn through a part revolution in the same direction as cam 3. When counter disk 2 rotates in a counter clockwise direction as indicated by the directional arrow, FIG. 2a, counting downward check lever 9 will also turn in the counter clockwise direction until the arm part 9a thereon engages a projection 5a on lever 5 to thereby prevent the follower rollers 6 from engaging the peripheries of their respective cams 4. However, at the same time, projection 11a on lever 11 is free from any engagement by arm part 9b of check lever 9 so that lever 11 will be urged by spring 12 to cause follower roller 13 thereon to engage the periphery of cam 3. In order not to obscure the remainder of the mechanism shown in FIG. 2a, however, cam follower 13 is shown in a position out of engagement with the cam 3. The direction of counter rotation reverses as soon as the cam follower 13 drops into the recess in cam 3 when the counter reaches zero. Counter disks 2 then rotate in a clockwise direction as does also check lever 9 whereupon arm portion 9b engages projection 11a on lever 11 to block the same from any movement and thus prevent cam follower 13 from engaging the cam periphery. On the other hand, projection 5a on lever 5 will be free from engagement by arm portion 9a so the cam follow rollers 6 are enabled to engage the peripheries of cams 4. When all cam followers 6 fall into their respective recesses in cams 4 which occurs when the desired number of coil turns has been reached on the counter, lever 5 will be displaced which actuates rod 70, as described later in detail, to thus initiate indexing of the winding machine and actuation of the reversing wheel 16 which causes a reversal in direction of rotation of the counter disks 2 so that the latter will then start to count down again to the zero indication.

Referring now to FIG. 5 and FIGS. 9–11, the reversal of the direction of rotation of the counter 1 is accomplished by means of the counter-reversing draw hook 18 which turns reversing wheel 16 90° by means of the pins 17 secured thereto. The reversing wheel 16 is cammed at 16a on that surface thereof which is adjacent the counter. Hollow shaft 19 which is connected in driving relation to the driving shaft (not shown) for the counter mechanism, is slidably movable along its axis, and mounted on said shaft for alternative coupling thereto are one gear 14' of gear train 14, and also one gear 15' of gear train 15. A key 21 on shaft 19 serves to couple the latter with the hub of gear 14'. When reversing wheel 16 occupies such a position, i.e. the position shown in FIG. 9, that neither of the two canned surfaces 16a engages the end of shaft 19, spring 20 functions to shift shaft 19 to the right so as to couple key 21 to gear 15' and hence effect a driving of shaft 19 and hence the counter mechanism in one direction. When reversing wheel 16 is rotated 90° from the position indicated in FIG. 9, one of the cams 16a will engage the end of shaft 19 thus forcing it to the left to thus uncouple key 21 from gear 15' and couple key 21' with gear 14' and hence effect a driving of shaft 19 and hence also the counter mechanism in the opposite direction. As shown in FIG. 1, gear trains 14 and 15 are driven by the face plate shaft 38; thus when key 21' engages gear train 14 the counter disks will be rotated additively, and when the key 21 engages gear train 15, the counter disks will be driven subtractively (i.e., in the opposite direction). Gear trains 14 and 15 although driven in the same direction as shaft 38 drive in opposite directions with respect to shaft 19 because gear train 15 has one more idler gear than gear 14.

Figure 4:
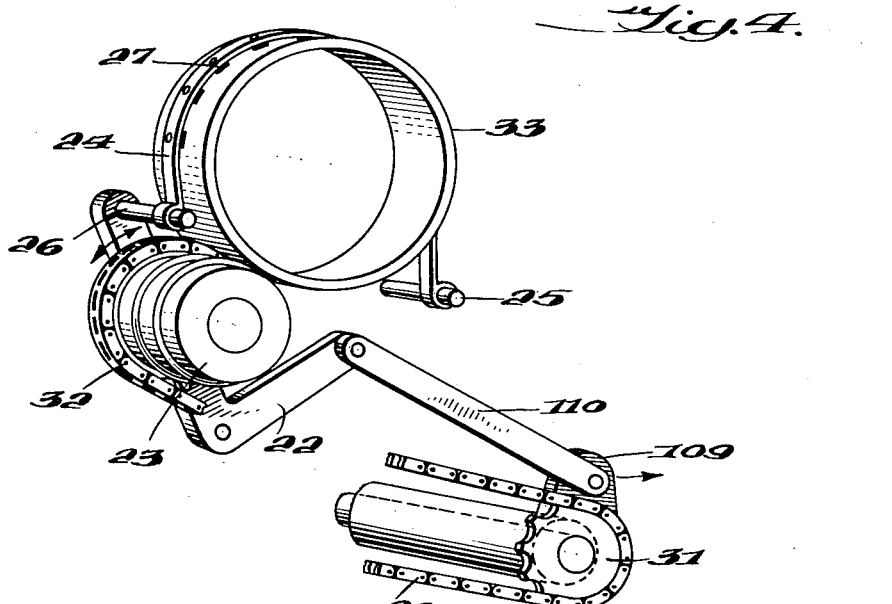

Simultaneously with the reversal of the counter operation the cylindrical face plate 33 is braked, the armature is indexed, and the wire loop end of the wound coil is drawn out. FIGS. 3 and 4 illustrate the means by which the cylindrical face plate is braked. With reference to FIG. 6, it will be seen that drive shaft 38 for the face plate is coupled by a chain and sprocket drive 113 to rotate a notched disk 78. At the moment that counter 1 reaches the desired turn number, a latch lever 73 is released, and as described hereinafter, effects a coupling between disks 78 and 79 to thereby rotate the latter and hence also a cam 103, see FIG. 3, which is mounted on shaft 79a and rotates only with a rotation of control disk 79. As cam 103 rotates, it presses toggle lever follower rollers 104 and 105 across the sleeve lever 106 against the compression spring 107 which is fixed with the screw 108. The sleeve portion of sleeve lever 106 as it moves turns cam 109 on the face plate side of the machine. By means of connecting rod 110 and toggle lever 22 two functions are brought to bear on the cylindrical face plate 33. First the brake band 24 is pressed briefly against the face plate by means of the lever stud 26; brake lugs on the band 24 function to brake the face plate. One end of the brake band is firmly secured to the machine by means of pin 25. The second function of the actuation of the toggle lever is the pressing of the rubber drive roller 23 against the face plate. The drive of this roller 23 comes from motor 53 by means of pulley 54, U-belt 55, pulley 56, worm shaft 57, worm wheel 58, sprocket wheel 29, chain 29', sprocket wheels 30 and 31, chain 28, and sprocket wheel 32. The cylindrical face plate 33 now runs with a greatly reduced rate of rotational speed (on the order of 200 r.p.m.) and the indexing operation of the armature by the counter takes place during this time of reduced speed. The drive of the face plate 33 comes from motor 34, across pulley 35, V-belt 36, pulley 37, and face plate drive shaft 38, as shown in FIGS. 1 and 3.

The cylindrical face plate 33 serves to rotatably support the armature 39 as shown in FIGS. 1 and 7. The armature 39 rests with its axle spindles on the two armature supports 40 and 41 and is pressed thereagainst by means of the tailstock 42 having tailstock sleeve 44 biased to the left in FIG. 1 by means of the compression spring 43. Secured to the extremity of tailstock sleeve 44 is the fixed wire guide 45 which must be exactly positioned each time with respect to the winding interval and to the armature. The armature may be manually inserted or removed from the face plate 33 after tailstock sleeve 44 is withdrawn by activation of foot lever 46, link 47 and toggle lever 48.

In order to prevent pedal 46 from being inadvertently actuated during the running of the machine, the electromagnetic lock device 49 is provided which is activated each time switch-on button 50 of the drive motor of the machine is operated; when switch-off button 52 is operated, the holding current of lock 49 is interrupted to permit free operation of pedal 46.

Assuming that the face plate 33 is stationary, the armature to be wound is partially inserted within the face plate with its axle spindles positioned, respectively, in the supports 40, 41 of FIG. 7 and the armature is held in place by the tailstock means 42—45 as shown in FIG. 1. Wire is fed from a supply reel through the wire guide bracket or fork 91 (FIG. 8) to the face plate 33. The free end of the wire is manually connected to loop hook 69 (FIG. 7) which for accessibility has been pivoted outwardly from face plate 33 by pressure on roller 59 (FIG. 6).

Upon commencement of the winding operation, trip lever 61 is swung back from the face plate and indexing slide 63 is displaced by spring 67 to retract loop hook 69 within the face plate. As face plate 33 is rotated by the motor drive means, wire will be wound in the armature slots adjacent the upper and lower edges of the wire guide 45 as shown in FIG. 1. When the desired number of wire turns in these two slots has been achieved, the counter mechanism actuates the linkage of FIG. 5 to swing trip lever 61 into a position to cause engagement by roller 59.

As shown in FIG. 7, during rotation of the face plate at reduced speed as described above, the roller 59 of indexing lever 60 strikes against the projection at the extremity of trip lever 61 to pivot connecting lever 62 and cause indexing slide 63 to move upwardly. Indexing hook 65 pivoted by pivot 64 to slide 63 is biased against the armature by spring 66 and engages an adjacent armature slot so that upon upward movement of slide 63, the armature will be rotatably indexed a slight degree to position the next free armature slot adjacent the wire guide. To prevent the armature from revolving back to its initial position, spring catch 68 is provided on the face plate 33 to removably engage an adjacent armature slot.

Upon activation of indexing slide 63, loop hook 69 is rotated outwardly about fixed journal 69a and draws out the wire loop which is later soldered to the commutator segment. The indexing operation is performed by levers 5 and 11 of couter 1 which function to actuate the rod 70 by suitable counter escapement means, not shown. Lever 5 is directly connected to rod 70 by a slotted hole and bolt connection while lever 11 merely presses by an escapement against this bolt to actuate rod 70. Rod 70 pivots index lever 71 about pivot 72 to release latch lever 73 which is then drawn upwardly by tension spring 74. Roller follower 75 mounted on lever 73 then contacts cam surface 76. Catch 77 meanwhile engages the next groove of the notched disk 78 and thus couples this disk with the control disk 79, positioned adjacent thereto. Control disk 79 has a recess into which the roller of control lever 80 can fall; spring 81 continuously biases control lever 80 pivotally in the direction of the control disk. When the roller of control lever 80 engages the recess, lever 82 is activated (see FIG. 5) to disconnect (by means of rod 83 and suitable switch means, not shown) the electrical power to the motor 34 which drives the face plate 33, control lever 80 is pivoted about pivot 84 and has at its other end a slot 85 which activates catch lever 86. As shown in FIG. 1, catch lever 86 is pivoted about pivot shaft 87 and has at its other end latch 88 which operates catch wheel 89 at each indexing operation; wheel 89 has as many teeth (or multiples thereof) as the number of grooves to be wound in the armature.

After a given armature groove is wound the catch wheel 89 is rotated one catch-tooth further by the catch 88; after all the armature grooves have been wound, pin 90 on the catch wheel 89 operates micro-switch 51 to open the machine circuit and the machine stops for removal of the wound armature and for the insertion of a subsequent unwound armature. Upon actuation of button 50 the machine's automatic operation is again initiated.

As shown in FIG. 5 the control lever 80 causes reversing of the counter as described above by means of connecting rod 99, toggle levers 100 and 101, and pin 102 by means of the reversing draw hook 18. At the same time, by means of the pin 102 the trip lever 61 is pivoted to trigger, in the manner described above indexing of the next armature 39 mounted in face plate 33.

For better wire distribution in the armature grooves a wire-guide bracket 91 (FIG. 8) may be moved back and forth by lever 93 pivoted at 92 and having follower 94 at the other end thereof in engagement with control cam 95. Lever 93 is continually biased against the control cam by tension spring 96. The wavy line to the right of the figure illustrates the outline of the machine.

Operation

As has been explained, a principal object of the invention is to wind a slot of the armature with the desired number of turns and then index the armature for the winding of the next adjacent slot without stopping the machine. The machine is slowed from its normally high winding speed but is not stopped.

Assuming that one of the armature slots is being wound when the counter 1 reaches the desired turn reading in an additive manner, lever 5 is actuated which in turn effects an actuation of rod 70 which releases latch lever 73, disk 78 is coupled to control disk 79 and the latter together with cam 103 is rotated. Rotation of control disk 79 accomplishes several functions. When control disk 79 rotates, it permits the end of spring loaded lever 80 to move from the periphery of disk 79 into the recess provided in the latter. This movement of lever 80 actuates lever 82 which in turn actuates switch rod 83 and effects an opening of the electrical circuit to motor 34 which had been driving the face plate 33 at a relatively high winding speed.

Rotation of control disk 79 also effects rotation of cam 103 which, through the mechanism shown in FIGS. 3 and 4, applies the brake band 24 to the periphery of face plate 33 to slow it down and simultaneously presses the slower speed driving roller 23 against the periphery of face plate 33 so as to cause the latter to be driven by motor 53 at a much slower speed, e.g. 200 r.p.m., while the loop is being pulled out and the armature is being indexed to the next adjacent slot winding position.

Indexing of the armature, etc. is effected by actuation of index lever 61 which is accomplished by movement of lever 80 and the linkage connected therewith as shown in FIG. 5. As indexing lever 61 is shifted in the direction of the arrow shown in FIG. 5, it actuates slide 63 which, see FIG. 7, causes the loop hook 69 to draw out the loop from the armature slot winding and also causes the indexing lever hook 65 to engage the armature and index it to the next armature slot winding position.

As index lever 61 is actuated, so also is the counter reversing lever 18. As seen in FIG. 5, lever 18 effects a 90° rotation of reversing wheel 16 which then causes the counter 1 to be driven in the reverse direction, this latter being detailed in FIGS. 9–11 which show how, when reversing wheel 16 is turned through 90°, one of the gear trains 14 or 15 is coupled to the driving shaft mechanism for counter 1 and the other is simultaneously uncoupled. After the driving mechanism for the counter has been reversed, control disk 79 is rotated again sufficiently to cause lever 80 to shift back to its original position. This releases the slow speed driving roller 23 from face plate 33, reconnects the electrical circuit to the high speed driving motor 34 and shifts index lever 61 and reversing lever 18 back to their initial positions, whereupon the machine proceeds to wind the next adjacent armature slot with the desired number of turns. When this has been done, the counter 1 will then have been driven subtractively until substantially a zero reading obtains whereupon lever 11 is actuated which then causes the same sequence of functions to take place as occurred when lever 5 was actuated by the counter.

While in accordance with the patent statutes I have illustrated and described the best form and embodiment of my invention now known to me, it will be apparent to those skilled in the art that other changes may be made in the apparatus described without deviating from the invention set forth in the following claims.

I claim:

1. In combination with an armature winding apparatus having an armature-holding face plate, driving means for revolving said face plate normally at a relatively high slot winding speed, a counter mechanism driven by said face plate driving means for counting the number of revolutions of said face plate, said means under control of said counter mechanism for imparting step by step rotation to said armature about its axis after the completion of each winding operation to present an unwound set of slots to be wound; the improvement which consists of means operable by said counter mechanism after a predetermined number of face plate revolutions for reversing the direction of rotation of said counter mechanism and means also operable by said counter mechanism for temporarily reducing the speed of rotation of said face plate at the end of each slot winding operation and prior to the next step movement of said armature.

2. Apparatus as defined in claim 1 wherein said counter mechanism has a rotatable shaft and further wherein the means for reversing the direction of rotation of said counter mechanism comprises a reversing cam, a sleeve non-rotatably connected to and slidably mounted upon said counter shaft, spring means biasing said sleeve into engagement with said reversing cam, said sleeve having a pair of keys thereon, a pair of gear trains driven by said face plate driving means, each of said gear trains having a counter-driving pinion engageable with a respective one of said keys, the counter-driving pinions of said gear trains being colinear with said sleeve, said counter-driving pinions being oppositely driven by said face plate driving means, and means operable by said counter mechanism to angularly displace said cam to cause said sleeve to be slidably displaced longitudinally thereby to effect engagement between one of said keys and a corresponding slot on one of said counter-driving pinions and to effect disengagement between the other of said keys and a corresponding slot on the other of said counter-driving pinions.

3. An automatic armature winding machine as defined in claim 2 wherein said counter has digit disks with cams adjustably connected thereto, said cams being angularly adjustable relative to said disks to a given position corresponding to the number of windings to be wound in a given pair of armature slots, a pair of follower levers biased into engagement with certain ones of said cams, and a check lever adjacent one of said digit disks and spring-biased into lateral frictional engagement therewith so that said check lever is rotated frictionally by said disk, said check lever being arranged to prevent one of said levers from engaging its associated cam means when the counter is rotated in one direction and for preventing the other of said levers from engaging its associated cam means when the counter is rotated in the other direction.

4. An armature winding apparatus as defined in claim 1 wherein said driving means for revolving said face plate includes a pair of driving motors, one of said motors being driven at a relatively high speed and the other of said motors being driven at a relatively low speed in relation to said face plate, and said means for temporarily reducing the speed of rotation of said face plate at the end of each slot winding operation includes means for rendering said high speed motor inoperative and said low speed motor operative.

5. An armature winding apparatus as defined in claim 4 wherein said means for rendering said high speed motor inoperative includes means for electrically disconnecting it from its source of power, and said means for rendering said low speed motor operative includes a driving roller rotated thereby and means for bringing said driving roller into frictional engagement with the periphery of said face plate.

6. An armature winding apparatus as defined in claim 4 and which further includes brake means also operable by said counter mechanism for braking the rotational speed of said face plate when said high speed motor has been rendered inoperative.

References Cited in the file of this patent
UNITED STATES PATENTS

| | | |
|---|---|---|
| 1,987,190 | Holmes | Jan. 8, 1935 |
| 2,284,115 | Wirth | May 26, 1942 |
| 2,829,532 | Togstad | Apr. 8, 1958 |

UNITED STATES PATENT OFFICE
CERTIFICATE OF CORRECTION

Patent No. 3,044,721

July 17, 1962

Otto Wirth

It is hereby certified that error appears in the above numbered patent requiring correction and that the said Letters Patent should read as corrected below.

Column 6, line 19, for "said", second occurrence, read -- and --.

Signed and sealed this 23rd day of October 1962.

(SEAL)
Attest:

ERNEST W. SWIDER
Attesting Officer

DAVID L. LADD
Commissioner of Patents